United States Patent [19]

Zeldin et al.

[11] 4,231,917
[45] Nov. 4, 1980

[54] HIGH TEMPERATURE CONCRETE COMPOSITES CONTAINING ORGANOSILOXANE CROSSLINKED COPOLYMERS

[75] Inventors: Arkady Zeldin, Rego Park; Neal Carciello, Patchogue; Lawrence Kukacka, Port Jefferson; Jack Fontana, Shoreham, all of N.Y.

[73] Assignee: The United States of America as represented by the United States Department of Energy, Washington, D.C.

[21] Appl. No.: 9,624

[22] Filed: Feb. 6, 1979

[51] Int. Cl.$^3$ .............................................. C08L 83/04
[52] U.S. Cl. ............................... 260/37 SB; 260/42.13
[58] Field of Search ................ 260/37 SB, 42.13, 827; 528/32

[56] References Cited

U.S. PATENT DOCUMENTS

| | | | |
|---|---|---|---|
| 2,965,593 | 12/1960 | Dietz | 260/827 |
| 3,198,766 | 8/1965 | Nitzsche et al. | 260/827 |
| 3,487,123 | 12/1969 | Bauer et al. | 260/37 SB |
| 3,808,287 | 4/1974 | Thomas | 260/827 |
| 4,158,617 | 6/1979 | Eldred | 260/827 |

OTHER PUBLICATIONS

Brookhaven National Laboratory; Cementing of Geothermal Wells; Progress Report No. 8; Jan.–Mar. 1978, BNL 50850.
Brookhaven National Laboratory; Cementing of Geothermal Wells; Progress Report No. 5; Apr.–Jun. 1977, BNL 50693.
Brookhaven National Laboratory; Cementing of Geothermal Wells; Progress Report No. 6; Jul.–Sep. 1977, BNL 50738.
Brookhaven National Laboratory; Alternate Materials of Construction for Geothermal Applications; Progress Report No. 10; Jul.–Sep. 1976, BNL 50594.
Brookhaven National Laboratory; Alternate Materials of Construction for Geothermal Applications; Progress Report No. 12; Jan.–Mar. 1977, BNL 50665.
Brookhaven National Laboratory; Alternate Materials of Construction for Geothermal Applications; Progress Report No. 14; Jul.–Sep. 1977, BNL 50751.

*Primary Examiner*—Lewis T. Jacobs
*Attorney, Agent, or Firm*—James E. Denny; Richard G. Besha and Cornell D. Cornish

[57] ABSTRACT

This invention relates to high temperature polymer concrete composites comprising about 10–30% by weight of a liquid monomer mixture consisting essentially of an organosiloxane polymer crosslinked with an olefinically unsaturated monomer selected from the group consisting of styrene, methyl methacrylate, trimethylolpropane trimethacrylate, triallyl cyanurate, n-phenylmalimide, divinyl benzene and mixtures theroef; and about 70–90% by weight of an inert inorganic filler system containing silica sand and preferably a member selected from the group consisting of portland cement, $Fe_2O_3$, carbon black and mixtures thereof; and optionally a free radical initiator such as di-tert-butyl peroxide, azobisisobutyronitrile, benzoyl peroxide, lauryl peroxide and other organic peroxides to initiate crosspolymerization of the monomer mixture in the presence of the inorganic filler.

9 Claims, No Drawings

HIGH TEMPERATURE CONCRETE COMPOSITES CONTAINING ORGANOSILOXANE CROSSLINKED COPOLYMERS

BACKGROUND OF THE INVENTION

This invention was made under, or during, the course of a contract with the United States Department of Energy.

This invention relates to high temperature organosiloxane polymer concrete compositions having thermal stability and only minor loss of mechanical characteristics at temperatures in excess of 260° C., particularly useful as well cementing material in geothermal wells and deep oil wells.

Polymer concrete composites which consist of an inert inorganic filler and an organic binder are being applied throughout the world as building materials and for the repair of deteriorated concrete. To date, limitations imposed by the thermal properties of the polymers have restricted the maximum service temperature to about 60° C. Above this temperature, marked reductions in strength and creep characteristics and durability have been noted.

There is also a need to improve the stability of cementing compositions against the severe thermal, chemical and pressure conditions encountered in geothermal wells.

Typical cementing compositions heretofore used in cementing geothermal wells have been low aluminate portland cements with 20 to 50% silica flour as additives along with retarders, friction reducers and antifoaming agents such as 0.5% sodium hexametaphosphate, 0.5% cream of tartar, or 0.5% carboxymethyl cellulose, and the like, all contributing to a mixture offering some of the needed properties of pumping and rheology which are essential to a successful cementing operation. However, said compositions exhibit a short setting time at elevated temperatures (i.e., less than 1 hour at 500° F., and a few hundred psi pressure), which presents a serious problem in the cementing of geothermal wells. It is also noted that the cements currently used deteriorate in the geothermal environments.

It has now been found that the high temperature polymer cement formulations of instant invention containing an organosiloxane copolymer as a binder for a concrete filler, are thermally stable at 350° C., exhibit only a slight (1%) weight loss at 400° C., and samples exposed for 30 days to 25% brine at 238° C. have not deteriorated. In addition, some of the formulations exhibit relatively long curing time (about 3 hours at 150° C.), thereby enhancing the pumpability of the materials.

The instant invention extends the operation characteristics of polymer concrete to at least 260° C. and up to 350° C. This is achieved by utilizing mixtures of organosiloxane crosslinked with monomers such as styrene, trimethylolpropane trimethacrylate, n-phenylmalimide, methyl methacrylate, divinyl benzene, triallyl cyanurate and mixtures thereof, in conjunction with fillers such as silica sand, portland cement, iron oxide, and carbon black; and wherein polymerization is accomplished by means of pressure or the use of free-radical initiators. These polymer concrete composites exhibit thermal stability and minimal loss in mechanical properties at temperatures up to at least 260° C. The high degree of control over polymerization rates, results in a pumpable mixture which may find application as well cementing material for use in geothermal and deep oil well completion systems. Instant high temperature polymer concrete composites finds potential applications as a high temperature corrosion resistant lining material for geothermal power systems and chemical process equipment.

Accordingly, it is a primary object of instant invention to provide for a high temperature organosiloxane copolymer concrete composition which extends the thermal stability thereof to at least 260° C.

Another object of instant invention is to provide for high temperature organosiloxane copolymer cementing compositions of high compressive strengths, above at least 1000 psi.

Still another object of instant invention is to provide stable polymer cementing compositions exhibiting no significant reduction in strength or increase in permeability after prolonged exposure to brine at elevated temperatures.

Still another object of instant invention is to provide a high temperature organosiloxane copolymer concrete composition, which is impermeable to water and is non-corrosive.

A further object of instant invention is to provide an organosiloxane copolymer cement composition possessing a delayed setting time at elevated temperatures.

Accordingly, instant invention relates to a high temperature polymer cement composition comprising about 10–30% by weight of a liquid monomer mixture consisting essentially of an organosiloxane polymer crosslinked with an olefinically unsaturated monomer selected from the group consisting of styrene, methyl methacrylate, trimethylolpropane trimethacrylate, triallyl cyanurate, n-phenylmalimide, divinyl benzene and mixtures thereof; and about 70–90% by weight of an inert inorganic filler system containing silica sand and preferably a member selected from the group consisting of portland cement, $Fe_2O_3$, carbon black and mixtures thereof; and optionally a free radical initiator such as di-tert-butyl peroxide, azobisisobutyronitrile, benzoyl peroxide, lauryl peroxide and other organic peroxides to initiate crosspolymerization of the monomer mixture in the presence of the inorganic filler.

More specifically, the organosiloxane contains an organic functional pendant group selected from the group consisting of $CH_3$, $CH=CH_2$, $C_2H_5$ of $C_6H_5$, which allows for crosslinking with the olefinically unsaturated monomers, the amount of crosslinking monomer being dependent on the amount of the organic functional pendant groups, and constitutes preferably about 15 to 25% by weight of the monomer mixture.

PRIOR ART

Organosiloxane is a known component in a variety of compositions, such as in the vulcanization of rubber and rubber cements as disclosed in U.S. Pat. No. 3,929,718 wherein a mixture of a finely divided silicon dioxide filler pretreated with an organosilicon compound and a diorganopolysiloxane is vulcanized at 100°–200° C. into an elastomer; and in U.S. Pat. Nos. 3,962,160 and 4,001,168, wherein a diorganosiloxane, an organofunctional silane crosslinking agent, and optionally a filler, is vulcanized at room temperature into a rubbery, solid elastic state or a glass-clear silicone rubber. Likewise, a polyester-siloxane resin which is the reaction product of one or more organofunctional organosiloxanes with a dihydric alcohol and/or di-carboxylic acid, in a vinylic solvent, with optionally a filler, has been utilized in heat resistant coating compositions, and castings by curing in the presence of a peroxide as disclosed in U.S. Pat. Nos. 2,842,517 and 3,075,941. U.S. Pat. No. 3,350,330 further discloses a non-skid protective coating composition containing organopolysiloxane convertible at room temperature into the solid, cured elastic state admixed with an inert filler, solvent and silane treated sand. U.S. Pat. No. 3,126,357 also discloses a high temperature cement or glue for bonding transducers to the shell or skin of rockets or missiles comprising a silicone resin which may be any organosiloxane polymer or mixture thereof in a xylene solvent, and a mica-silica mixture cured at elevated temperatures into a bendable but noncracking cement. Bituminous compositions containing a preformed copolymer of an organopolysiloxane and a monomer such as styrene, is also disclosed in U.S. Pat. No. 4,026,853; and impregnating resin formulations for glass cloth containing an alkenylorganosiloxane polymer, an olefinic organic compound and two separate free radical catalysts is disclosed in U.S. Pat. No. 3,487,123.

Although the prior art discloses the use of organosiloxane as a component in a variety of compositions, the making of silicone polymer concrete utilizing aggregate and an organosiloxane crosslinked copolymer as the binder to give a high strength, thermally stable up to about 350° C., long-durability product, particularly useful for cementing geothermal and oil field wells, is not disclosed.

DESCRIPTION OF THE INVENTION

The silicone polymer concrete composition, according to this invention, consists essentially of about 70–90% by weight of a sand filler and about 10–30% by weight of a liquid monomer mixture of an organosiloxane polymer containing pendant groups selected from the group consisting of $CH_3$, $CH=CH_2$, $C_2H_5$ and $C_6H_5$ copolymerized with an olefinically unsaturated monomer selected from the group consisting of styrene, methyl methacrylate, trimethylolpropane trimethacrylate, triallyl cyanurate, n-phenylmalimide and divinyl benzene in the presence of from 1 to 3000 psi pressure or by means of the addition of about 0.5–2% of a free radical initiator.

Silicones, as used herein is defined as organosilicon polymers containing Si-O-Si bonds, in which the silicon atoms are bound to each other through oxygen atoms, the silicon valences not taken up by oxygen being saturated by at least one organic group. The prototype for the simple linear polymer is as follows:

$$-\underset{\underset{R}{|}}{\overset{\overset{R}{|}}{Si}}-O-\underset{\underset{R}{|}}{\overset{\overset{R}{|}}{Si}}-O-(R_2SiO)_n$$

wherein R represents a pendant group selected from the group consisting of $CH_3$, $CH=CH_2$, $C_2H_5$, $C_6C_5$ and mixtures thereof.

The name siloxane was based on the formulation of the Si-O-Si unit as sil-oxane and this has found general acceptance in scientific nomenclature.

The composition of a siloxane unit is determined by the fact that each oxygen atom functions as a link between two silicon atoms so that each silicon atom can be considered to have only a half-share in each oxygen atom. The general formula of members of the above series is, therefore, 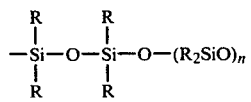

The actual organosiloxane units are represented by this formula with "n" values from 1 to 3. The free valences on the oxygen determine the functionality of each siloxane unit. The organosiloxane units are therefore mono-, di-, or trifunctional. The nonfunctional molecule $R_4Si$ cannot be used as a structural unit in polymers but the tetrafunctional structural group ($SiO_{4/2}$) is occasionally used with the others in the synthesis of organosiloxane polymers. The monofunctional siloxane unit (n=3) can combine with itself only once, giving hexaorganodisiloxane $R_3Si$-O-$SiR_3$.

The difunctional unites (n=2) give closed rings (cyclic organosiloxanes) on combination with one another giving 3, 4, or 5 siloxane units.

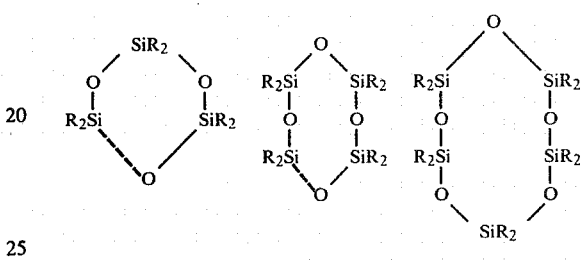

Trifunctional siloxane units (n=1) combining with one another generally produce molecules crosslinked randomly in three dimensions.

The monomer system of instant invention consists of an organosiloxane containing pendant groups such as $CH_3$, $CH=CH_2$, $C_2H_5$, $C_5H_5$, or mixtures thereof, and a crosslinking olefinically unsaturated (vinyl type) monomer such as styrene, trimethylolpropane trimethacrylate, methyl methacrylate, triallyl cyanurate, n-phenylmalimide, divinyl benzene and mixtures thereof. Depending upon the amount of pendant groups in the organosiloxane, from about 15–50% and preferably 15 to 25% by weight of the crosslinking monomer or mixture of monomers can be added.

The crosslinked combination of siloxanes with said vinyl type monomers by means of aforesaid organofunctional pendant groups forms relatively stable copolymer structures linked through Si-C bonds. The organosiloxane is copolymerized with the vinyl type monomer, the reaction proceeding through the unsaturated groups by heating the materials in air with organic peroxide initiators or with the use of pressure, about 1–3000 psi and preferably above 1000 psi at elevated temperatures above 110° C. (conditions normally found at the site of the geothermal or deep wells). In this way a combination of siliconcarbon polymeric linkage is obtained. The degree of crosslinking through olefinic polymerization is much greater than if other polymerization methods are used.

One type of organosiloxane used as a comonomer in polymer concrete has a chemical structure as shown below.

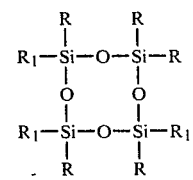

wherein R is $CH_3$ and $R_1$ is $CH=CH_2$.

This type of structure has unsaturated groups which can be copolymerized with vinyl type monomers such as styrene or methyl methacrylate by free radical reactions with the use of a free radical initiator such as di-tert-butyl-peroxide, or with the use of pressure at elevated temperatures, preferably at a pressure above 1000 psi and a temperature above 110° C.

Another type of organosiloxane used is a polydimethyl siloxane with pendant vinyl or phenyl groups. This material also can be copolymerized with styrene or methyl methacrylate using a free radical initiator such as di-tert-butyl peroxide, or by means of pressure at 120°–150° C. A chemically and thermally stable crosslinked copolymer is formed.

A third but less commonly used copolymer can be made using a polyfunctional siloxane crosslinked with a polydimethyl siloxane. This reaction is performed using a free radical initiator such as di-tert-butyl peroxide or the use of pressure at elevated temperatures above 110° C.

The free radical initiator used is not limited to di-tert-butyl peroxide. Other free radical initiators such as azobisisobutyronitrile, and organic peroxides such as benzoyl peroxide, lauroyl peroxide, etc. can be used. The most thermally and chemically stable crosslinked copolymers are made with the higher activation temperature initiators.

The monomer mixture may be cured using said free radical initiator by mixing with the monomer system at concentrations of 0.5 to 2.0% by weight. The curing temperature is dependent on the type of initiator used but varies from about 75°–200° C. and preferably 75°–145° C. for about 2 to 88 hours and preferably 5 to 20 hours. The thermal stability of the polymer system, as measured by thermogravametric analysis, indicates that these polymers have weight losses of about 0–3% by weight up to 350° C.

The thermal stability of the copolymer and of the organosiloxane and the olefinically unsaturated monomers such as styrene, and/or trimethylolpropane trimethacrylate, and triallyl cyanurate or n-phenylmalimide or divinyl benzene is a function of the ratio of the organosiloxane and the monomer or mixture of monomers and is dependent on the content of the organofunctional pendant groups such as the vinyl groups in the siloxane molecular chain as clearly shown in Table I, wherein the organosiloxane utilized is a fluid polymer containing 20% pendant vinyl groups, (1 vinyl group for 4 siloxy groups) supplied by Union Carbide and described as a clear water white liquid having a viscosity at 25° C. of 300±100 centistokes, flash point (estimated) greater than 149° C. and a pH of 7.5.

TABLE I

THERMAL STABILITY OF VARIOUS SILOXANE COPOLYMERS

| Monomer Composition wt % Y9208[b] | styrene | Cross-linking wt % | Initiator DTBP wt % | Curing conditions time,hrs. | temp.,°C. | Polymer Weight Loss[a], % at 250° C. | 300° C. | 350° C. | 400° C. |
|---|---|---|---|---|---|---|---|---|---|
| 100 | 0 | 0 | 0.5 | 4 | 155 | | | | |
| | | | | 2 | 185 | 0.02 | 0.05 | 1.0 | 1.03 |
| 85 | 15 | 0 | 0.5 | 16 | 160 | 0.25 | 0.6 | 1.25 | 3.0 |
| 80 | 20 | 0 | 0.5 | 64 | 150 | 1.25 | 1.3 | 2.48 | 6.25 |
| 80 | 20 | 0 | 1.0 | 64 | 150 | 0.5 | 0.6 | 1.3 | 5.2 |
| 75 | 25 | 0 | 0.5 | 16 | 100 | | | | |
| | | | | 4 | 155 | 0 | 0 | 0.4 | 2.7 |
| 70 | 30 | 0 | 0.5 | 64 | 150 | 1.2 | 1.28 | 3.5 | 9.8 |
| 60 | 40 | 0 | 0.5 | 16 | 145 | 1.4 | 2.5 | 3.75 | 9.5 |
| 80 | 0 | 20[c] | 0.5 | 16 | 145 | 0.2 | 0.6 | 1.1 | 2.5 |
| 75 | 20 | 5[d] | 0.5 | 16 | 150 | | | | |
| | | | | 2.5 | 200 | 0 | 0 | 1.8 | 8.4 |
| 75 | 23.5 | 1.5[e] | 0.5 | 64 | 105 | | | | |
| | | | | 3 | 155 | 0.2 | 0.2 | 1.0 | 3.1 |
| 75 | 23 | 2[f] | 0.5 | 64 | 105 | | | | |
| | | | | 3 | 155 | 1.0 | 1.0 | 1.3 | 5.0 |

DTBP, di-tert-butyl peroxide
[a]measured in $N_2$ atmosphere with Dupont 990 and TGA module
[b]Y9208 is the organosiloxane from Union Carbide aforedefined
[c]Trimethylolpropane trimethacrylate
[d]Triallyl cyanurate
[e]N-phenylmalimide
[f]Divinyl benzene Using these monomer systems as binding materials for polymer concrete composites decreases the porosity of the concrete and produces materials which have exceptionally high compressive strengths and thermostability. The filler systems for polymer concrete in accordance with present invention are preferably mixtures of silica sand and portland cement in the ratio of 9:1, 8:2, and 7:3. However, other filler systems such as coarse silica per se or mixtures of silica sand and $Fe_2O_3$, silica sand and carbon black and mixtures thereof also produce composites with high compressive strengths and good durability properties when exposed to hot brine solutions.

The compressive strength of instant novel organosiloxane copolymer concrete is a function of particle size of the aggregate and the composition as shown in Table 2, wherein No. 500 Sand indicates that all the sand particles will pass through a sieve size No. 500, and Nos. 100, 50, 30 and 16 are sieve sizes with progressively smaller openings for finer particle sizes. It was found that a silica sand mixture of 50 parts by weight of No. 16, 25 parts of No. 30 and 25 parts of No. 100 has the proper particle size distribution to produce a high quality polymer concrete with a minimum polymer content. The addition of portland cement to this mixture enhances its durability to brine and steam, making it particularly useful in high temperature applications. Portland cement is a fine gray powder containing 62–67% CaO, 18–20% $SiO_2$, 4–8% $Al_2O_3$, 2–3% Fe, 1–4% Mg, 0.5% K and Na and traces of Ti, Mn, made by calcining limestone and clay or rivermud. Portland cement Type III is a high early strength cement containing $SiO_2$, $Al_2O_3$, $Fe_2O_3$, CaO and MgO as the major chemical constituents.

The organosiloxane utilized in Table 2 contains 20% pendant vinyl groups and is the same as defined in Table I.

TABLE II

COMPRESSIVE STRENGTH OF ORGANOSILOXANE PC AS A FUNCTION OF AGGREGATE SIZE AND COMPOSITION

| Monomer composition, wt % | | | Compressive strength, psi | |
|---|---|---|---|---|
| OS | St | Aggregate composition, % | Controls | after exposure for 30 days to brine at 240°C. |
| 75 | 25 | 100% No. 500 Sand | 6,034 | 5,443 |
| 75 | 25 | 65% No. 500 Sand-35% Type III Cement | 2,924 | 2,918 |
| 75 | 25 | 36% No. 16 Sand-17% No. 30 Sand-17% No. 100 Sand-30% No. 50 Sand | 5,849 | 4,200 |
| 100 | 0 | Same as Above | 1,789 | 1,150 |
| 75 | 25 | 90% No. 500 Sand-10% Type III Cement | 12,358[1] | 11,150 |
| 75 | 25 | 95% No. 500 Sand-5% $Fe_2O_3$ | 11,084[2] | 9,200 |
| 75 | 25 | 100% No. 30 Sand | 689 | — |
| 75 | 25 | 65% No. 30 Sand-35% Type III Cement | 4,588 | 7,016 |
| 75 | 25 | 100% No. 100 Sand | 370 | — |
| 75 | 25 | 65% No. 100 Sand-35% Type III Cement | 3,160 | 3,200 |

OS, Organosiloxane
St, Styrene
1. Boiling water absorption % - 0.33
2. Boiling water absorption % - 0.31

Stability tests in brine at 240° C. and at 300° C. to determine if hydrolysis of the material occurred, indicate only minor deterioration after exposure for 30 days and 15 days, respectively.

The following examples are merely illustrative of present invention and is not to be construed as limited thereto.

EXAMPLE I

A liquid monomer mixture of linear polydimethyl siloxane polymer with 20% pendant vinyl groups, and styrene monomer was made in a ratio of 3 to 1 by weight. A free radical initiator, di-tert-butyl peroxide, was added at a concentration of 0.5% by weight of said monomer mixture. The initiated monomer mixture was then added to an aggregate mix containing 9 parts silica flour sand and 1 part Type III portland cement. The monomer mixture constitutes 25.9% of the total mixture. The thermal polymerization of this polymer concrete mix was accomplished at 110° C. for 3 hours with continued heating at 165° C. for 16 hours. When the sample was cooled to room temperature, cylinders of 1 in. by 2 in. were cut and tested.

The compression test indicated strengths greater than 12000 psi. The boiling water absorption after 5 hours was 0.33 wt%. Samples of this polymer concrete were exposed in an autoclave for 30 days to a brine solution at 240° C. Compression tests after this exposure showed a strength decrease of less than 10%. Additional testing of the polymer concrete samples in air at 260° C. for 1600 hours indicated that the weight loss of polymer was less than 0.5 wt%. There was no change in weight from 150 to 1600 hours.

EXAMPLE II

Using the same monomer mixture as in Example I with an aggregate composition of 95% by weight silica flour sand and 5% by weight $Fe_2O_3$, polymer concrete samples were made using the same monomer concentration and polymerization conditions. The compressive strengths of these samples were measured to be greater than 11,000 psi and the boiling water absorption was 0.31 wt%. After exposure to the brine solution at 240° C. for 30 days, the strength showed a decrease of less than 17%.

Heating of polymer concrete samples in air at 260° C. for 1600 hours indicated a polymer loss of less than 0.5 wt%. The weight loss occurred in the first 150 hours and then stabilized for up to 1600 hours.

EXAMPLE III

With the same monomer mixture used in Example I and aggregate composed solely of silica flour sand, polymer concrete samples were made using the same initiator and curing temperatures described in Example I.

The compressive strength of these samples was greater than 6000 psi. After exposure to the brine solution at 240° C. for 30 days, the strength decreased by less than 10%.

Heating of the polymer concrete samples in air at 260° C. indicated a polymer weight loss of 0.57 wt%. The weight loss occurred during the first 250 hours of heating and then stabilized for up to 1600 hours.

EXAMPLE IV

A linear polydimethyl siloxane polymer containing 20% pendant vinyl groups ($CH=CH_2$) and styrene monomer in the ratio of 3:1 was mixed with a di-tert-butyl peroxide initiator at a concentration of 0.5 wt% of the total monomer weight. A filler mixture containing silica sand and portland cement in the ratio of 9:1 was mixed with the above monomer system in the ratio of 3 parts filler to 1 part monomer system and cured in glass tubes at 145° C. for 5 hours. After curing, a solid polymer concrete with compressive strengths up to 12,500 psi was formed. When exposed to boiling water for 5 hours, the polymer concrete had a water absorption of 0.3 wt%. Samples exposed to 25% brine solutions of 240° C. for 30 days did not show any deterioration and still had compressive strengths up to 12,000 psi. Additional testing in steam at 275° C. and 900 psi did not show any surface deterioration, indicating that the polymer concrete has good hydrolytic stability.

In lieu of the linear polydimethyl siloxane polymer containing 20% pendant vinyl groups, other organosiloxanes may be utilized inclusive of the cyclic organosiloxanes, three-dimensional organosiloxanes and other linear organosiloxanes containing from about 2% to 30% pendant vinyl groups and phenyl or ethyl pendant groups instead of, or in addition to the methyl group.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

What is claimed is:

1. A thermally stable polymer concrete composition comprising about 10-30% by weight of a liquid monomer mixture consisting essentially of an organosiloxane polymer containing pendant groups selected from the group consisting of $CH_3$, $CH=CH_2$, $C_2H_5$, $C_6H_5$, and mixtures thereof, and capable of being crosslinked, and at least one olefinically unsaturated crosslinking monomer in an amount of about 15% to 50% by weight of said monomer mixture, and about 70-90% by weight of an inorganic filler system containing silica sand and portland cement in ratios ranging from about 9 parts sand to 1 part cement, to, 7 parts sand to 3 parts cement.

2. The composition in accordance with claim 1, wherein the olefinically unsaturated monomer is selected from the group consisting of styrene, methyl methacrylate, trimethylolpropane trimethacrylate, triallyl cyanurate, n-phenylmalimide and divinyl benzene.

3. A composition in accordance with claim 2, wherein the filler system additionally contains a member selected from the group consisting of, $Fe_2O_3$, carbon black and mixtures thereof.

4. A composition in accordance with claim 1, wherein the filler system is sand and portland cement in the ratio of 9:1.

5. A composition in accordance with claim 4, wherein the organosiloxane polymer is a polydimethyl organosiloxane containing 20% pendant vinyl groups.

6. A composition in accordance with claim 1, containing about 0.5-2% by weight of a free radical initiator selected from the group consisting of organic peroxides and azobisisobutyronitrile.

7. A thermally stable up to at least 260° C., non-corrosive concrete of high compressive strength prepared by curing the composition of claim 6 at temperatures of about 75° C. to 200° C.

8. A thermally stable up to at least 260° C., non-corrosive concrete of high compressive strength prepared by curing the composition of claim 1 at a temperature above 110° C. and under pressure above 1000 psi.

9. A solid cured polymer concrete composition of claim 2, wherein the monomer mixture forms a chemically stable crosslinked copolymer of organosiloxane and olefinically unsaturated monomer.

* * * * *